United States Patent [19]

Tippmann

[11] 4,149,840
[45] Apr. 17, 1979

[54] APPARATUS FOR PRODUCING RIGID FOAM PLASTIC INSULATING PANELS

[76] Inventor: Eugene R. Tippmann, 10120 Islepine Dr., Ft. Wayne, Ind. 46815

[21] Appl. No.: 849,693

[22] Filed: Nov. 8, 1977

[51] Int. Cl.² .............................................. B29C 15/00
[52] U.S. Cl. .................................. 425/371; 425/4 C; 425/389; 264/46.3
[58] Field of Search ................. 425/371, 93, 4 C, 335, 425/389; 198/835, 813; 264/46.3

[56] References Cited

U.S. PATENT DOCUMENTS

| | | | |
|---|---|---|---|
| 1,580,519 | 4/1926 | Meyer | 425/129 X |
| 2,007,910 | 7/1935 | Stephens | 198/813 |
| 3,215,581 | 11/1965 | Carlson et al. | 425/93 |
| 3,462,795 | 8/1969 | Hermanns | 425/371 |
| 3,700,368 | 10/1972 | Wells | 425/4 C X |
| 3,736,081 | 5/1973 | Yovanovich | 425/371 X |
| 3,763,993 | 10/1973 | Whikehart et al. | 198/835 |
| 3,773,167 | 11/1973 | McGinnis | 198/835 |
| 3,827,846 | 8/1974 | Weiler et al. | 425/371 |
| 3,941,543 | 3/1976 | Buonanno | 425/371 |

*Primary Examiner*—Robert L. Spicer, Jr.
*Attorney, Agent, or Firm*—Joseph J. Baker; Gerald J. Ferguson, Jr.

[57] ABSTRACT

An apparatus is disclosed for making foam plastic insulating panels. The apparatus has a lower conveyor band forming a support surface and a first continuous form belt on the support surface and an upper conveyor band forming a limiting surface and a second continuous form belt on the limiting surface. The conveyor bands are supported for rotation between conventional tires, the inflation of at least one of the tires controls the pressure on the form belts adjacent their initial point of contact. Resilient metal clips are provided which lock the support and limiting surfaces together during curing of the foam plastic panel.

16 Claims, 9 Drawing Figures

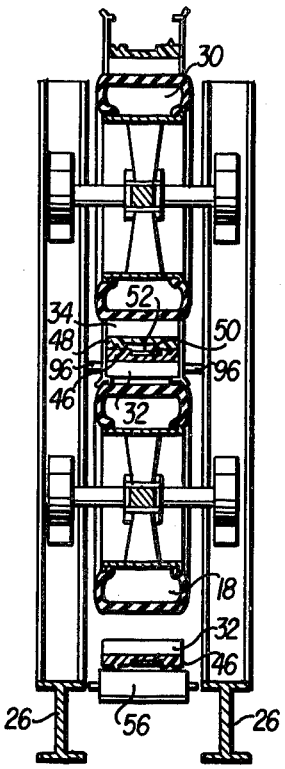
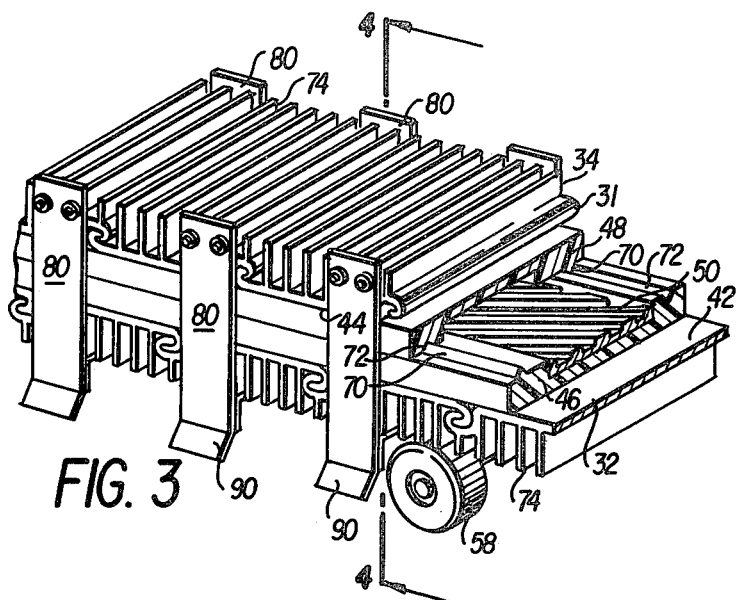
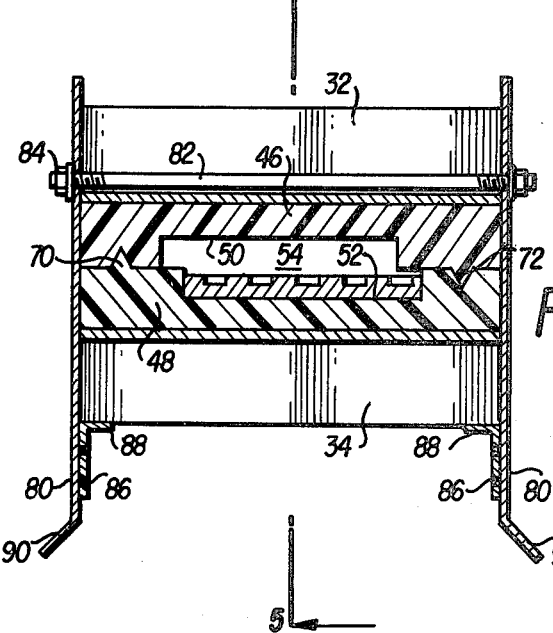
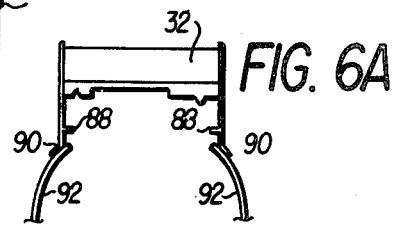
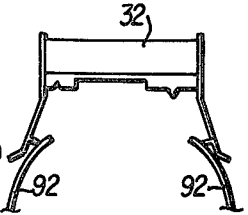
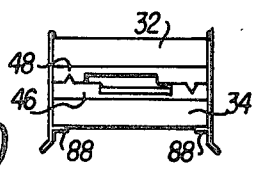
FIG. 2
FIG. 3
FIG. 4
FIG. 5
FIG. 6A
FIG. 6B
FIG. 6C
FIG. 6D 4,149,840

APPARATUS FOR PRODUCING RIGID FOAM PLASTIC INSULATING PANELS

BACKGROUND OF THE INVENTION

1. Field of the Invention

This invention relates to improvements in apparatus for continuously making rigid foam plastic insulating panels for use in building construction.

2. Description of the Prior Art and Objects

It is known to provide configured belts backed up by rigid conveyors for the continuous molding of three dimensional material as shown in U.S. Pat. No. 3,914,084. More and more materials for the building and general construction industry such as siding, insulating siding sheets and panels are being made out of polystyrene, cellulose acetate, polyurethane and the like thus necessitating the construction of more machines to supply this demand. However, due to the high pressures encountered during the continuous molding of such material out of the aforementioned plastic foams, the machines to make such material are very expensive to manufacture, operate and maintain. The major expense areas are in the complex controls and gearing to drive the parallel belt carrying conveyors, devices to set initial pressure between the configured belts, extensive stationary tracking to maintain the configured belts together during the foam reaction, the configured belts themselves, and the parallel conveyors, particularly if they consist of a series of articulated platens.

In addition to the cost of the machines of the prior art as aforementioned, there is often enormous waste of material resulting from their operation due to the leakage from the mold of the foam core as it expands thus necessitating extensive trimming to achieve the final product.

The primary object of the present invention is thus to provide a novel apparatus for the continuous production of rigid foam plastic insulating paneling which overcomes all of the previously mentioned objections of the apparatus of the prior art.

It is another object of the present invention to provide such an apparatus employing conveyor bands consisting of a series of interlocked, articulated platens of extruded metal having a finned surface for heat absorption and dissipation.

It is yet another object of the present invention to provide such an apparatus employing belts of castable plastic material, the upper and lower sections of the belt forming a continuous mold cavity and each section having continuous mating grooves and projections for containing the expanding foam.

It is a further object of the present invention to provide such an apparatus having resilient metal clips for maintaining the bands and thus belts in precise relationship to each other.

It is a still further object of the present invention to provide such an apparatus utilizing conventional tires as support and drive rollers for the conveyor bands and the degree of inflation thereof controlling the pressure exerted on the belts by the conveyor bands.

The novel features which are believed to be characteristic of the invention, both as to its organization and method of operation, together with further objectives and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 2 is a cross-sectional view of the apparatus taken along the lines 2—2 of FIG. 1, FIG. 3 is a perspective view of the conveyor bands and molding belts employed in the apparatus, FIG. 4 is an enlarged cross-sectional view taken along the lines 4—4 of FIG. 3, FIG. 5 is a cross-sectional view taken along the lines 5—5 of FIG. 4, and FIGS. 6 A-D is a diagrammatic illustration of the manner in which the clips of the present invention are deflected at the points of convergence and divergence of the conveyor bands and molding belts.

DETAILED DESCRIPTION OF PREFERRED EMBODIMENT

Figure 1:
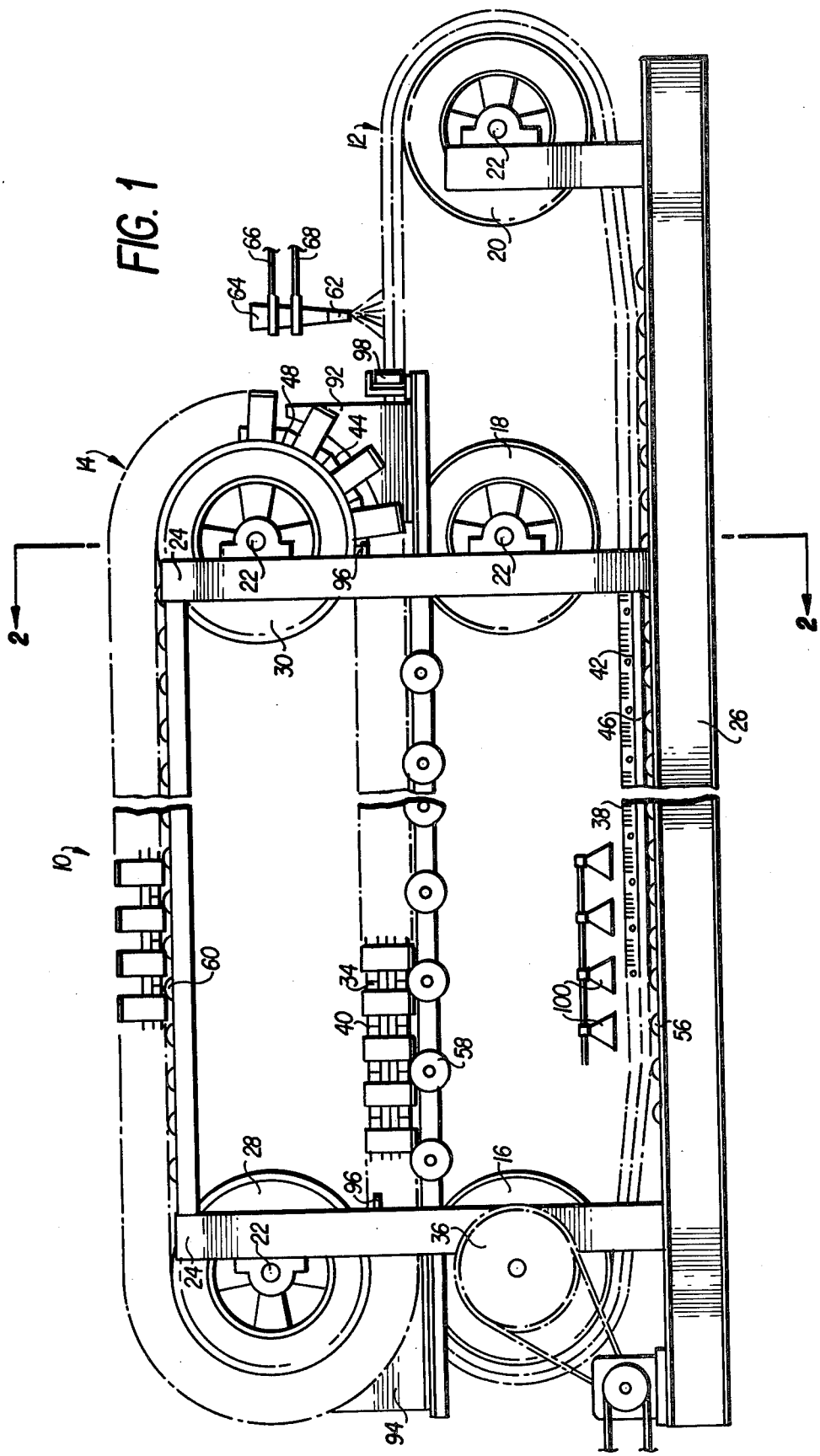
FIG. 1 is a side elevation of the apparatus of the invention.

Referring now to FIGS. 1 and 2 of the drawings where like characters of reference indicate like elements in each of the several views, numeral 10 indicates generally the apparatus for producing rigid foam plastic insulating panels or boards. The apparatus 10 comprises a lower conveyor 12 and an upper conveyor 14 in parallel spaced relationship to lower conveyor 12.

Three conventional tires 16, 18, 20 are rotatably mounted in bearings 22 which in turn are secured to vertical supports 24 on base 26. The tires are capable of holding air under pressure of at least fifty pounds per square inch. Two additional tires 28, 30 similar to tires 16, 18, 20 are rotatably mounted in bearings 22 secured to the vertical supports 24. The tires 16 and 28 are in vertical alignment with each other as are tires 18 and 30. A lower endless conveyor band 32 is provided around tires 16 and 20 and over tire 18. An upper endless conveyor band 34 is also provided around tires 28 and 30. The tire 16 serves as the drive tire for the entire device and it is driven by a motor (not shown) connected by suitable gearing to drive sprocket 36. The lower conveyor band 32 is driven in the counter-clockwise direction while upper conveyor band 34 is driven in the clockwise direction. The lower and upper conveyor bands 32, 34 are comprised of a series of articulated platens 38, 40 respectively which will be described in greater detail later. It is sufficient to say at this point that the platens 38 comprising the lower band 32 form a support surface 42 and the platens 40 comprising the upper band form a limiting surface 44.

A first endless belt 46 is positioned on the lower conveyor band 32 adjacent the support surface 42 and a second endless belt 48 is positioned on the upper conveyor band 34 adjacent the limiting surface 44. Belts 46, 48 are made of an elastomeric material, such as, for example, castable urethane. The belts 46, 48 each have on the surface thereof facing away from the bands, a cavity 50, 52 respectively. The cavities 50, 52 form, when placed opposite each other during rotation of the belts 46, 48, a continuous molding tunnel 54. More precise structural details of the belts 46, 48 will be described later.

The lower conveyor band 32 and first belt 46 are supported during their lowest point of travel by a series of parallel spaced apart steel rollers 56 and during their highest point of travel by rubber covered spaced apart wheels 58. Similarly, upper conveyor band 34 and second belt 48 are supported during their lowest point of travel by wheels 58 and during their highest point of travel by a series of parallel spaced apart steel rollers 60.

The chemistry involved is well known to those skilled in the art of making rigid foam plastic boards. It is sufficient, for the purposes of this invention to understand that an unfoamed liquid of plastic material is deposited on the first belt 46 at a station adjacent the point of convergence of the first and second belts 46, 48. The ingredients in the plastic liquid react in the tunnel 54 to form a rapidly expanding foam which is capable of exerting very high pressures. Briefly, the liquid plastic material is discharged from a nozzle 62 of a distributor 64 in which is mixed chemical ingredients 66, 68 from various sources (not shown). The chemicals 66, 68 are mixed in a high speed spiral mixer inside distributor 64 in a well known manner. A typical polyurethane foam plastic core is described in U.S. Pat. No. 3,215,581 and broadly speaking it comprises a mixture of polyether resin, a fluorocarbon blowing agent, a catalyst such as dibutyl tin dilaurate and polymethylene polyphenyl isocyanate. The reaction gives off heat (exothermic) as the foaming occurs.

Referring now to FIGS. 3 through 5, the first belt 46 is shown having a rib projection 70 on one side of the cavity 50 extending parallel to the outside edge of the belt 46 and a groove 72 on the other side of the cavity 50 and also parallel to the outside edge. The second belt 48 is substantially similar to first belt 46 and it also has projection 70 and a groove 72. When the first and second belts 46, 48 come together in mating engagement the projections 70 enter the grooves 72 and serve two important functions. The first function being to ensure the proper and critical alignment of the two belts with respect to each other so that the panel being formed in the mold tunnel 54 will have the desired dimensions. The second function being to serve as a gasket to ensure that none of the expanding foam core escapes from between the belts 46, 48. The channels 74 shown on the bottom of cavity 50 are those required to form the foam insulating panel set forth in my aforementioned copending application and form no part of this invention.

As aforementioned, the first endless belt 46 is located adjacent the support surface 42 and the second endless belt 48 is located adjacent the limiting surface 44. The support surface 42 and limiting surface 44 are each formed of a series of platens 38, 40 respectively. The platens 38, 40 are identical in construction and are made of a light weight metal such as extruded aluminum. The platens 38, 40 have a central portion consisting of a plurality of longitudinally extending, parallel, spaced apart fins 74 which serve to both absorb or dissipate heat from the platen as will be more fully described later. The fins 74 also act as reinforcing ribs to increase the structural rigidity of the platen. On one end of the platens 38, 40 is located a downturned hook 76 and on the other end of the platens is an upturned hook 78 for mating with respective oppositely disposed hooks to form a series of platens which are articulate. The hooks 74, 76 permit individual platens to be easily added or removed to change the lengths of the belts as desired. This is accomplished by merely sliding the platens relative to each other.

The platens 40 constituting the upper conveyor band 32 each have clips 80 depending from the sides thereof perpendicular to the limiting surface 44. The clips 80 are secured to the platens 40 by means of bolts 82 which extend across the platen between the fins 74. Nuts 84 engage the ends of the bolts. The clips 80 are made of spring steel so that they will return to their perpendicular position if deflected. The clips 80 also have brackets 86 the ends 88 of which extend as projections towards each other and are secured to the clips by means such as spot welding or the like. The clips 80 and brackets 86 of the platens 40 are normally positioned adjacent to the ribbed portion of the platens 38 so that during the period that the foam core is expanding and curing, the lower and upper conveyor bands 32, 34 and first and second endless belts 46, 48 are maintained in a sandwich or fixed type relationship to each other dispite the enormous pressures developed within the mold tunnel 54.

Each clip 80 has a portion 90 of the unsecured end thereof bent out of the plane of the remainder of the clip the purpose of which bent portion can best be seen by referring to FIGS. 1 and 6. The platens 40 on the upper conveyor band 32 each have clips 80 secured thereto as aforementioned and best seen in FIG. 4. As the platens 40 are rotated clockwise to converge with the platens 38, the bent portion 90 of each oppositely disposed clip 80 engages a bracket 92 positioned on either side of the lower conveyor band 32. The brackets 92 have gradually sloping edges which deflect the bend portion 90 of each clip 80 slightly away from each other as shown in FIG. 6(a). As the conveyor band 34 and platens 40 continue to rotate the clips 80 and more specifically the projections 88 are deflected by the brackets 92 further away from each other as further shown in FIGS. 6(b) and 6(c). At the end of travel of each clip 80 against the brackets 92, a platen 38 of the lower conveyor band 32 will be brought into position substantially below the platen 40. At this point, the bent portions 90 which are at their point of greatest deflection permit the platens 38 to enter therebetween and as the bent portions 90 leave the brackets 92 they snap back thus bringing the projections 88 in locking position adjacent the finned surface of the platens 38. The clips 80 also serve to transmit the driving force imparted to the lower conveyor band 32 to the upper conveyor band 34 thus eliminating the necessity of extensive synchronized gearing. The sandwiched together and locked platens 32, 34 and belts 46, 48 travel on rollers 58 a distance which is determined by the time required for the plastic foam material to cure.

At the point of divergence of the lower and upper conveyor bands 32, 34, brackets 94 are provided for again engaging the bent portions 90 and gradually deflecting them to permit the projections 88 to disengage the finned surface of the lower platens 38. At the point of greatest deflection of the clips 80 the respective lower platen 38 is well clear of the projection 88 and the clip is permitted to snap back into its rest position as it travels back to the convergent point again. In order to ensure that the projections 88 do in fact completely engage the finned surface of the platens 38, rollers 96 are provided to engage the side of the clips 80 and press it into its rest position normal to the platen 40. Rollers 98 are also provided to ensure the proper alignment of the lower conveyor band 32 and belt 46.

In order to firmly compress the first and second belts 46, 48 together the required amount to ensure proper sealing and containment of the expanding plastic foam core, the tires 18 and 30 are inflated by air. The pressures capable of being generated between the tires are substantial. For example, if the surface area of engagement between the two tires is approximately thirty-five square inches, and the pressure in each tire is fifty pounds per square inch, the clamping pressure is approximately seventeen hundred and fifty pounds per square inch. Thus, as can be seen, a very close approximation of the clamping pressure can be determined at any time by merely using a conventional tire pressure gauge and multiplying the pressure indicated by thirty-five.

To prevent the considerable waste of plastic foam material which occurs when the machine is started up and the belts 46, 48 are cold, heat lamps 100 are provided. The heat lamps 100 are positioned above the underside of the lower conveyor band 32 adjacent the finned surface thereof. The fins 74 absorb this heat and transfer it to the support surface 42 which is in contact with the belt 46. The belt 46 is thus heated as it approaches the distributor 64 and the heated belt permits the foam plastic material to rise to the required height on the belt completely filling the molding tunnel 54. Incomplete filling of the molding tunnel 54, of course, results in an unusable product or waste. As aforementioned, the reaction of the mixed chemicals is exothermic and thus, after the machine has been running a while, the heat lamps 100 are turned off and the belt is heated by the exothermic chemical reaction. The fins 74 also serve to then dissipate excess heat thus generated so that no damage to the castable urethane belt can occur therefrom.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An apparatus for making insulating siding panels of foamable plastic material comprising:
   a. a lower conveyor band having a series of abutting platens forming a continuous support surface and a first continuous form belt on said support surface;
   b. an upper conveyor band spaced from said lower conveyor and having a series of abutting platens forming a continuous limiting surface in a plane parallel to said horizontal plane of said lower conveyor and a second continuous form belt on said limiting surface, said first and second form belts defining a space therebetween corresponding to the panel to be produced when said belts are in abutting relationship;
   c. pneumatic means for exerting an adjustable, opposed pressure on said form belts in the area adjacent the initial point of contact between said belts; and
   d. means for maintaining said form belts together against the pressures exerted by said foamable plastic material.

2. An apparatus as set forth in claim 1 wherein said upper and lower conveyor bands are supported for rotation by spaced apart inflatable tires and said means for controlling the pressure on said form belts is air introduced into at least one of said tires.

3. An apparatus as set forth in claim 1 wherein said means for maintaining said form belts together comprises clip means extending between said platens of said lower and upper conveyor bands.

4. An apparatus as set forth in claim 3 wherein said clip means is secured at right angles to each side of each of said platens forming said limiting surface and each of said clip means on each of said platens has projections thereon for engaging said platens forming said support surface.

5. An apparatus as set forth in claim 4 wherein said projections on said clips of each of said platens extend toward each other and lie in the same plane when said clips are in engagement with said platens forming said support surface.

6. An apparatus as set forth in claim 5 wherein said clip means are made of resilient material and said apparatus further comprises means located at one end of said lower and upper conveyor for deflecting said clip means sufficiently to permit said oppositely disposed projections to clear said platens forming said support surface until said upper and lower platens are parallel to each other.

7. An apparatus as set forth in claim 6 wherein said apparatus further comprises means located at the other end of said lower and upper conveyor for deflecting said clip means out of engagement with said platens as said platens of said lower and upper conveyor bands begin to diverge from each other.

8. An apparatus as set forth in claim 1 wherein said platens have hook means on the ends thereof for interlocking with adjacent platens to form said series.

9. An apparatus as set forth in claim 1 wherein said platens have a plurality of longitudinally extending fins for absorbing and dissipating heat.

10. An apparatus as set forth in claim 9 wherein said apparatus further comprises means for heating said fins of at least a part of said platens forming said support surface.

11. An apparatus as set forth in claim 1 wherein said first and second form belts have a centrally located recess extending longitudinally thereof, said recess forming a continuous mold for a part of said panel, each of said belts further having a projection extending longitudinal adjacent one side of said recess and a groove extending longitudinally adjacent the other side of said recess.

12. An apparatus as set forth in claim 11 wherein said groove and said projection of said first continuous belt is arranged for respective mating engagement with said projection and said groove of said second continuous belt to prevent said foam plastic from escaping said belts.

13. An apparatus as set forth in claim 12 wherein said first and second belts are made of castable urethane.

14. An apparatus as set forth in claim 2 wherein said lower conveyor band is further supported by an idler tire positioned opposite one of said tires of said upper conveyor band.

15. An apparatus as set forth in claim 14 wherein said means for exerting pressure on said first and second form belts is air introduced into both of said oppositely positioned tires.

16. An apparatus as set forth in claim 1 wherein said platens are sections of extruded aluminum.

* * * * *